July 17, 1951     J. H. NILSON ET AL     2,560,814

MAGNETIC ROTOR OPERATED SWITCH

Filed Aug. 2, 1947     2 Sheets-Sheet 1

INVENTORS.
James H. Nilson
Vernon C. Westberg

BY Thiess, Olsen & Mecklenburger
Attorneys

July 17, 1951  J. H. NILSON ET AL  2,560,814
MAGNETIC ROTOR OPERATED SWITCH
Filed Aug. 2, 1947  2 Sheets-Sheet 2

INVENTORS.
James H. Nilson
Vernon C. Westberg
BY
Thiess, Olson & Mecklenburger
Attorneys Patented July 17, 1951

2,560,814

UNITED STATES PATENT OFFICE 2,560,814

MAGNETIC ROTOR OPERATED SWITCH

James H. Nilson, Wilmette, and Vernon C. Westberg, Chicago, Ill., assignors to Sun Electric Corporation, Chicago, Ill., a corporation of Delaware Application August 2, 1947, Serial No. 765,745

2 Claims. (Cl. 200—87)

This invention relates to rectifiers having a reed carrying a movable contact between fixed contacts, more particularly to such rectifiers wherein the reed is magnetically actuated and it is an object of the invention to provide an improved rectifier of this character.

The rectifier forming the subject matter of this application is disclosed but not claimed in the applicants' copending application, entitled Tachometer Generating Apparatus, filed August 2, 1947, Serial No. 765,744, now Patent No. 2,460,999, February 8, 1949, and assigned to the same assignee as the present invention.

In apparatus for indicating the rotational speed of engines or turbines, for example, it is necessary for accurate indications to be produced whether the speed is low or high, it being not unusual for the speed range to vary from one or two hundred revolutions per minute up to five thousand revolutions or more per minute. Moreover, while operating at any point within such a speed range, the direction of rotation may be either forward or backward and the tachometer apparatus must provide uniformly accurate speed indications.

Tachometer apparatus for such conditions of operation may include a generator coupled to the rotating machinery for generating an alternating voltage and a rectifier also coupled thereto for rectifying the voltage generated.

It is a further object of the invention to provide an improved magnetically operated rectifier for producing accurate and uniform rectification irrespective of the speed or direction of operation of the driving equipment.

According to the invention, a reed of magnetizable metal is arranged to form part of the magnetic circuit of a pair of permanent magnets, and a rotor with a segmental or interrupted periphery is provided to alternately direct flux lines to the reed for actuating it in one direction and for diverting flux lines from the reed to permit its actuation in the other direction. Contacts are arranged to cooperate with the reed in each of its positions whereby full wave rectification is obtained.

It is a further object of the invention to provide a rectifier of the foregoing character embodying improved means for directing the flux lines to the reed at substantially the same position of the rotor and for directing the flux lines away from the reed at a correlative position of the rotor irrespective of the direction of rotor rotation.

It is a further object of the invention to provide an improved rectifier of the character indicated wherein external magnetic fields are prevented from interfering with the uniform and symmetrical operation.

In carrying out the invention in one form rectifier means are provided comprising stationary contact means, movable contact means operable to engage the stationary contact means, a constant source of magnetic flux, and means for directing flux from said source to operate said movable contact means.

For a more complete understanding of the invention, reference should be had to the accompanying drawings in which.

Referring more particularly to the drawings, the invention is shown embodied in a rectifier comprising a pair of permanent magnets 10 and 11, a magnetic yoke 12, a movable metallic reed 13, and a rotor 14 for alternately making and breaking a magnetic flux path through reed 13 whereby to effect vibrating movement thereof.

Figure 2:
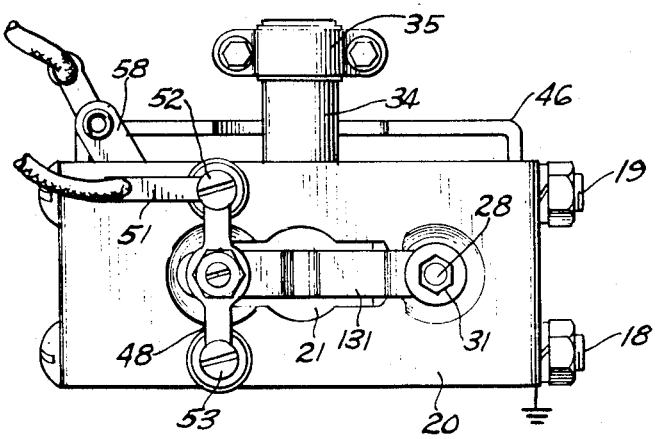
Fig. 2 is a top view of the structure shown in Fig. 1.

The yoke 12 is U-shaped, having a top member 20 and two end members or legs 15 and 16 extending therefrom, the legs and top preferably being integral with each other although separate parts may be fastened together. At the lower ends of legs 15 and 16, magnets 10 and 11 are arranged in alignment with a pole 17 between them thereby forming structure having a generally rectangular outline, pole 17 being midway between the legs. Each magnet is provided with slots along both sides through which bolts 18 and 19 pass for holding magnets 10 and 11, pole 17, and yoke 12 in a rigid unitary arrangement. In top member 20 an elongated hole 21 (Fig. 2) is formed as by punching and a portion of the metal at each end thereof is formed into depressed portions 22 and 23 thereby providing a channel for receiving reed 13.

Figure 1:
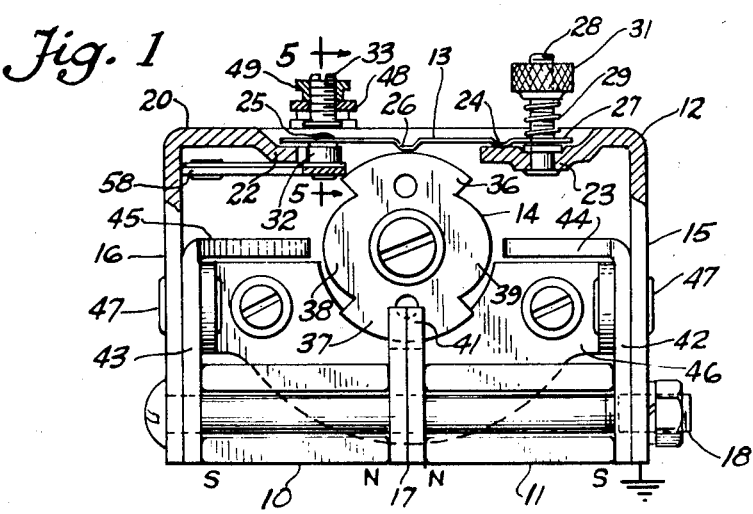
Fig. 1 is a front elevational view partially broken away and partially in section of a rectifier embodying the invention.
Figure 3:
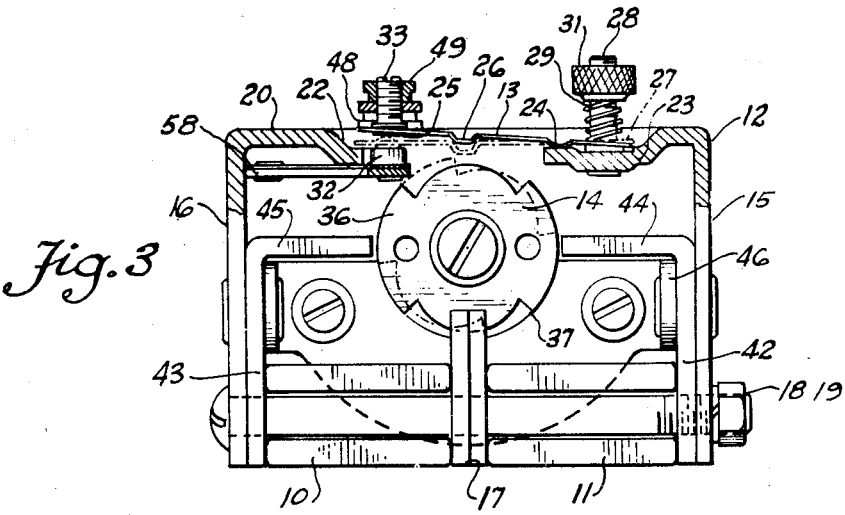
Fig. 3 is a view similar to Fig. 1 with the rectifier operating parts in a different position.

Reed 13 is a thin, flat metallic strip provided with a depressed portion or pivot 24 adjacent one end, an upper and lower contact 25 at the other end, and a depressed portion 26 substantially midway therebetween. Pivot 24 bears against depressed portion 23 and to the right thereof is an extension 27 having a hole through which a threaded stud 28 attached to depressed portion 23 extends. A spring 29 surrounds stud 28 and is biased against extension 27 by the nut 31. By virtue of pivot 24, extension 27 is spaced away from portion 23 whereby spring 29 urges reed 13 toward its uppermost position (Fig. 3). In the lowermost position of reed 13 (Fig. 1), contact 25 touches contact 32, and in its uppermost position, contact 25 touches contact 33.

On a shaft 34 supported by a bearing 35 which may be part of the structure supporting the rectifier, there is the rotor 14 co-operating with pole 17 and depressed portion 26 to complete a flux path through reed 13, the rotor being of about the same width as reed 13 and being placed so as to be substantially thereunderneath. Rotor 14 comprises a pair of diametrical sectors 36 and 37 spanning ninety degrees of arc, alternating with a pair of sectors 38 and 39 also spanning ninety degrees of arc. Sectors 36 and 37 are of greater radius than sectors 38 and 39, thereby producing a rotor having an interrupted periphery, the change from a sector of one radius to that of another radius being along a radial line as shown. The radii of the two groups of sectors are such that in the vertical rotor position there is only a very small gap between either sector 36 or 37 and depressed portion 26, and when the rotor is in the horizontal position there is a large gap between either sector 38 or 39 and depressed portion 26.

The pole 17 is shown as including two pieces but it may be one solid member. Pole 17 extends the full width of yoke 12 and includes tips 41 extending upwardly on each side of the rotor sufficiently to lie within the periphery of sectors 38 and 39 so as to be in position for completing a flux path through rotor 14 in any position of rotation.

The magnets 10 and 11 are oriented with their north poles adjacent pole 17. Consequently, with the structure as thus far described, when rotor 14 is vertical (Fig. 1), a flux path is completed from the north pole of magnet 11, through pole 17, the rotor, depressed portion 26, reed 13 including pivot 24, depressed portion 23, a portion of top member 20, leg 15, to the south pole of magnet 11. Similarly, there is a flux path from the north pole of magnet 10 through pole 17, the rotor, depressed portion 26, reed 13 including pivot 24, depressed portion 22, the portion of top 20 lying along each side of channel 21 and leg 16 to the south pole of the magnet. In this rotor position the gap between sector 36 (similarly for sector 37) and depressed portion 26 is small so the flux passes through the circuits described and the reed 13 is attracted to move into its lowermost position against the force of spring 29. When the rotor has turned to the dotted position of Fig. 4, there is a large gap formed between sector 38 (similarly for sector 39) and depressed portion 26. Consequently, there is little flux in the circuits described and spring 29 holds the reed in its uppermost position (Fig. 3).

Firmly attached to legs 15 and 16, respectively, are L-shaped members 42 and 43, the lower extremities of these members extending down into contact with the ends of magnets 11 and 12. At the upper ends of members 42 and 43, respectively, there are horizontally directed shunt members 44 and 45, the extremities of the shunts extending inwardly to form a small air gap with sectors 36 and 37, this air gap being of the same order of magnitude as that formed by depressed portion 26 and these sectors. An attaching yoke 46 is held to magnetic yoke 12 by means of rivets 47 which also hold members 42 and 43 thereto. The rear portion of yoke 46 is curved downwardly and is provided with a pair of holes to receive screws holding the rectifier to associated apparatus.

Figure 5:
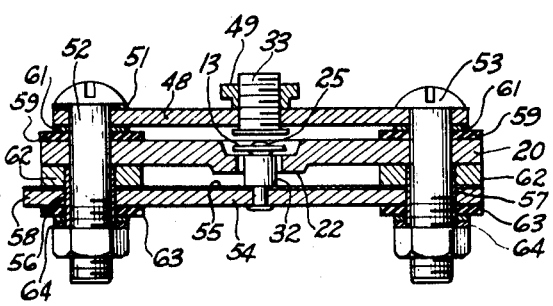
Fig. 5 is a sectional view taken substantially along lines 5—5 of Fig. 1.

Since reed 13 contacts yoke 12 with its depressed portion 24, the yoke may be used as an electrical connection and thus is shown grounded. Consequently, movement of contact 25 between contacts 32 and 33 may be used to effect full wave rectification. Referring to Fig. 5, contact 33 is threaded for adjustabilty and is received in a transverse member 48, a lock nut 49 being provided for holding the contact in position. A lead 51 is connected to transverse member 48 by a bolt 52 which serves to hold one end of member 48 to top 20 of the magnetic yoke, a similar bolt 53 serving a like purpose at its other end. The contact 32 is riveted to a transverse member 54 which is held to the bottom of top 20 by the bolts 52 and 53, an insulating strip of fiber or Bakelite 55 being provided along the top surface of member 54 which together with cylindrical insulating sleeves 56 and 57 surrounding bolts 52 and 53, respectively, serves to insulate contact 33 from contact 32. An extension 58 on one end of member 54 may have a lead attached thereto for completing an electrical circuit. Fiber washers 59 and metal washers 61 space transverse member 48 upwardly from top 20, metal washers 62 space transverse member 54 downwardly to account for the depressed portion 22, insulating washers 63 complete the insulating of transverse member 54 from top 20, and lock washers 64 hold the nuts on bolts 52 and 53 tightly in place. Fiber washers 59 and sleeves 56 and 57 also serve to insulate contact 33 from top 20.

When contact 25 engages contact 32, an electrical circuit may be completed through yoke 12, reed 13, and member 54, and when contact 25 engages contact 33, a circuit may be completed through yoke 12, reed 13, and transverse member 48.

When rotor 14 is in the position shown in solid lines in Fig. 3, magnetic circuits are completed from magnets 10 and 11, through members 42 and 43, shunt members 44 and 45, sectors 36 and 37, and pole 17. The gaps between shunt members 44 and 45 and sectors 36 and 37 are small so that substantially all of the flux flows through these circuits. The gap from reed depressed portion 26 to sector 39 (or to sector 38 in a position rotated 180°) is large and thus substantially none of the flux passes through reed 13. Consequently, the reed is not attracted by the rotor and the spring 29 causes the reed to be tilted about pivot 24 to the position shown in solid lines, with contact 25 engaging contact 33. As the rotor rotates and the leading edge of sector 36 approaches the front edge of depressed portion 26, the trailing edges of sectors 36 and 37 are approaching the ends of shunt members 45 and 44. In this position, just prior to the one shown in dotted lines in Fig. 3, the reed 13 is still in the position shown by the solid lines. But at this point the gap from the front edge of depressed portion 26 to the leading edge of sector 36 is small. Accordingly, there are two flux paths to the magnets, one including reed 13 and the other including the shunt members 45 and 44.

As the leading edge of sector 36 approaches the midpoint of depressed portion 26, the trailing edges of sectors 36 and 37 approach the center of the thickness of shunt members 45 and 44, and as the rotor moves a very minute amount more, the gap at the shunts 45 and 44 becomes larger and the major portion of the flux flows suddenly through depressed portion 26. As a result, the reed 13 is suddenly attracted and moves to the position shown dotted to effect touching of contacts 32 and 25.

Figure 4:
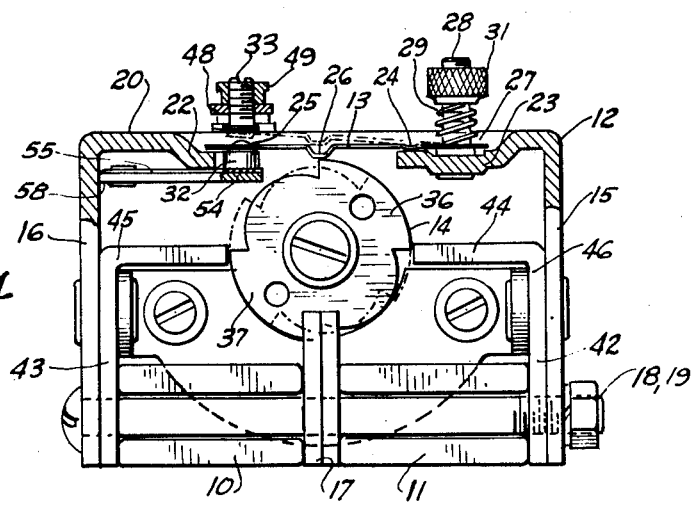
Fig. 4 is a view similar to Figs. 1 and 3 with the operating parts in still a different position.

During the movement of the rotor from the position shown dotted in Fig. 3 to that shown solid in Fig. 4, the reed remains in its lowermost position since the flux paths remain the same. Referring to Fig. 4, when the leading edges of sectors 36 and 37 approach the shunt members 44 and 45, the trailing edge of sector 36 approaches the front of depressed portion 26 and there are two flux paths, one including reed 13 and the other including shunt members 44 and 45. The shunt members divert flux from reed 13 and thus weaken the field therethrough. The reed holds its position (shown in solid lines) until the trailing edge of sector 36 reaches about the middle of the depressed portion, at which point the leading edges are cooperating with about half the thickness of shunt members 44 and 45. Virtually immediately following the position shown in solid lines in Fig. 4, the shunt members divert all of the flux away from reed 13 and depressed portion 26 since the gap at depressed portion 26 becomes larger while that at shunt members 44 and 45 remains small. Accordingly, the magnetic attraction for reed 13 is released and spring 29 forces the reed to the position shown in dotted lines where contact 25 engages contact 33.

The bottom of depressed portion 26 is short along the circumferential direction of rotor 14 and it is spaced downwardly several thicknesses of the reed metal, preferably about three or four thicknesses. Consequently, the leading edge of sector 36, for example, does not coact magnetically with the main body of the reed to the left of depressed portion 26, on clockwise rotation, because the main body thereof forms too large a gap. The leading edge coacts only with the depressed portion. Similarly, when the trailing edge of sector 36 leaves depressed portion 26, there is no coaction with the body of reed 13 to the right of depressed portion 26 because the gap is large. The magnetic circuit with the reed is then suddenly made and broken at the same relative point, that is when the leading edge and the trailing edge of sector 36 pass about the midpoint of depressed portion 26. The reed remains in each of its positions the same proportion of the total cycle. Like operation occurs when the leading and trailing edges of sector 37 come opposite depressed portion 26.

During the counterclockwise rotation of the rotor, the reed operation is substantially identical to that described except that in effect the trailing edges become leading edges. Thus, in Fig. 4 (counterclockwise rotation), in the dotted rotor position, the shunts 45 and 44 divert the flux away from reed 13 and the reed remains in its dotted position. As the rotor 36 approaches the position shown in solid lines, two flux paths are provided and as it first moves past this position, the shunts become ineffective, and the reed is suddenly attracted to the position shown dotted. Due to the downward displacement of depressed portion 26, the edge of sector 36 co- operates only therewith and not with the body to the right thereof. Similarly, when continuing counterclockwise rotation the position shown in dotted lines in Fig. 3 is reached, and the shunts are about to become effective to direct flux away from reed 13. Slight movement beyond the position shown dotted and the gap at depressed portion 26 is increased, whereupon the spring moves reed to the position shown solid. Also due to the downward displacement of portion 26, the sector 36 coacts only therewith and not with the main body of the reed. Consequently, reed operation occurs substantially when the leading and trailing edges of the sectors move past the center of the depressed portion.

Since the gaps between depressed portion 26 and the rotor sectors and between the shunt members 44 and 45 and the sectors change when the edges of the sectors move past the center of the depressed portion, the effective point of operation under depressed portion 26 remains the same distance from fulcrum or pivot 24 irrespective of the direction of rotation. Hence, the lever arm against which the spring 39 operates remains the same and with a fixed adjustment thereof the operation remains symmetrical. That is, the reed operation is the same irrespective of the direction of rotation.

The point at which the reed operates may be changed or adjusted slightly by tightening or loosening the nut 31.

The reed 13 lies in the channel 21 substantially in between the thickness of the metal forming the top 20, the channel being sufficiently wide so that there is an air space of several reed thicknesses on each side thereof. Hence the flux from magnets 10 and 11 must flow through the fulcrum 24 and cannot jump from the sides of channel 21 to the reed. The reed is therefore in a substantially field free space so that external fields cannot affect its operation, particularly its symmetrical operation when the rotation is reversed. This is of importance in units operating at high speeds since small extraneous fields will affect the point at which reed operation occurs. Substantially centrally of channel 21 so as to surround the depressed portion 26, there is a circular cutout portion. The function of this is to prevent any leakage flux from the top 20 to the sectors 36 and 37, when these sectors approach and are in a vertical position. All the flux must flow through the fulcrum 24 and depressed portion 26 of the reed. This also is an important factor during high speed operation. The reed has some inertia and consequently a small amount of time elapses before movement occurs. This is minimized by making the reed light in weight, and the extraneous effects caused by leakage and stray fields are reduced as described. The weight of the reed and stiffness of spring 29 may be chosen so that the natural frequency of vibration of the reed and spring is beyond the frequency of reed movement. Hence there is little tendency for the reed to bounce away from the contacts at high speed operation.

Figure 6:
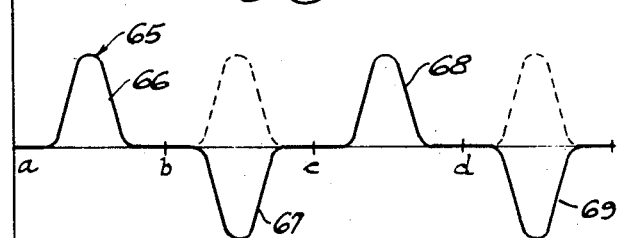
Fig. 6 is a curve for explaining the operation of the invention.

Bearing the foregoing structure in mind, the operation of the rectifier may be considered relative to the voltage wave 65 of Fig. 6. The voltage wave is shown with alternate positive and negative pulses, 66, 67, 68, and 69 separated by intervals of zero voltage, the duration of the pulses and the zero intervals being substantially the same. Movement of reed 13 takes place at the center of the zero intervals, for example, at

*a, b, c* and *d*. With the direction of the voltage changing, making and breaking the contacts at these points may produce rectification, as is well understood. Thus the contacts 25 and 33 may be closed for positive pulse 65 and contacts 25 and 32 may be closed for negative pulse 67. The reed operates at substantially the same point relative to the rotor irrespective of the direction of operation; the contact operation occurs at points *a, b, c,* or *d* irrespective of the direction of rotation.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

Having thus described the invention, what is claimed and desired to be secured by Letters Patent is:

1. Switch means comprising a pair of aligned bar magnets having poles of the same polarity adjacent each other, a pole held therebetween, a yoke having two ends respectively abutting the other poles of the magnets, said yoke including a top portion extending between said two ends, said top portion including a pair of depressed portions spaced apart and an opening therebetween, an elongated reed pivoted at one end in one of said depressed portions for movement between two positions and including a downwardly offset portion within said opening, contacts at the other end of said reed adapted to engage fixed contacts, a rotor including alternate sectors of greater and lesser radii, said rotor being rotatable to alternately complete and interrupt a magnetic path from said pole to said offset portion by said greater and lesser sectors respectively, shunt poles extending inwardly from said yoke ends, said rotor providing a shunt path in cooperation with said shunt poles for the flux from said magnets when said magnetic path is interrupted, said opening including an enlarged central portion to prevent said top portion from interfering with reed movement when said rotor completes said magnetic path.

2. Switch means comprising a pair of aligned bar magnets having poles of the same polarity adjacent each other, a pole held therebetween; a yoke having two ends respectively abutting the other poles of the magnets, and a top portion extending between said ends, said top portion including an indented portion having an opening therethrough; a rotor including alternate sectors of greater and lesser radii with rapid variation from one to the other; an elongated reed lying within said indented portion pivoted at one end, and including a downwardly offset portion within said opening; a contact at the other end of said reed; stationary contacts on said top portion for cooperating with said contact; said reed being movable between two positions and being biased toward one thereof; said rotor cooperating with said pole and said offset portion for completing a magnetic circuit for flux from said magnet through the greater radii portion of said rotor for effecting movement of said reed against its bias to its other position; said reed returning to said one position under the influence of its bias when said lesser radii portion of said rotor comes into operative relation with said offset portion, thereby interrupting said magnetic circuit; and shunt poles extending from said ends cooperating with said rotor for effecting a rapid decrease of a flux through said offset portion at the interrupting of said magnetic circuit and a rapid increase of flux through said offset portion at the completing of said magnetic circuit.

JAMES H. NILSON.
VERNON C. WESTBERG.

REFERENCES CITED

The following references are of record in the file of this patent:

UNITED STATES PATENTS

| Number | Name | Date |
|---|---|---|
| 808,957 | Varley | Jan. 2, 1906 |
| 921,046 | Wilson | May 11, 1909 |
| 1,839,075 | Young et al. | Dec. 29, 1931 |
| 2,004,114 | Hubbell, Jr. | June 11, 1935 |
| 2,112,214 | Tognola | Mar. 22, 1938 |
| 2,205,909 | Place | June 25, 1940 |
| 2,207,506 | Cox | July 9, 1940 |
| 2,264,058 | Vigren et al. | Nov. 25, 1941 |
| 2,268,834 | Kuperus | Jan. 6, 1942 |
| 2,323,910 | Hubbell | July 13, 1943 |
| 2,333,230 | Beechlyn | Nov. 2, 1943 |
| 2,459,930 | Fink | Jan. 25, 1949 |

FOREIGN PATENTS

| Number | Country | Date |
|---|---|---|
| 22,419 | Great Britain | 1905 |